(12) United States Patent
Brockhage et al.

(10) Patent No.: US 6,359,887 B1
(45) Date of Patent: *Mar. 19, 2002

(54) TRANSPARENT CIRCUIT EMULATION FOR PACKET SWITCHING NETWORK

(75) Inventors: Donald F. Brockhage, Sunnyvale; Michael D. Savini, San Jose, both of CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/430,322

(22) Filed: Oct. 29, 1999

Related U.S. Application Data

(63) Continuation of application No. 08/721,193, filed on Sep. 27, 1996, now Pat. No. 5,987,030.

(51) Int. Cl.[7] .................................................. H04J 3/26
(52) U.S. Cl. ........................................ 370/394; 370/519
(58) Field of Search ................................ 370/394, 473, 370/474, 465, 508, 519

(56) References Cited

U.S. PATENT DOCUMENTS

| | | |
|---|---|---|
| 5,065,396 A | 11/1991 | Castellano et al. |
| 5,168,356 A | 12/1992 | Acampora et al. |
| 5,274,635 A | 12/1993 | Rahman et al. |
| 5,293,570 A | 3/1994 | Schmidt et al. |
| 5,333,132 A | 7/1994 | Chuniaud et al. |
| 5,365,272 A | 11/1994 | Siracusa |
| 5,400,324 A | 3/1995 | Eriksson et al. |
| 5,404,354 A | 4/1995 | Hayter et al. |
| 5,467,342 A | 11/1995 | Logston et al. |
| 5,486,864 A | 1/1996 | Zdepski |
| 5,526,361 A | 6/1996 | Hedberg |
| 5,583,859 A | 12/1996 | Feldmeier |
| 5,608,733 A | 3/1997 | Vallee et al. |
| 5,970,067 A | 10/1999 | Sathe et al. |
| 5,987,030 A | * 11/1999 | Brockhage et al. ......... 370/394 |
| 5,987,034 A | 11/1999 | Simon et al. |

FOREIGN PATENT DOCUMENTS

| | | |
|---|---|---|
| WO | WO90/12467 | 10/1990 |
| WO | WO93/03569 | 2/1993 |

OTHER PUBLICATIONS

Douglas E. Comer, "Internetworking With TCP/IP, vol. 1: Principles, Protocols, and Archetecture, Third Edition", Prentice Hall, Inc pp. 95–99, 1995.

(List continued on next page.)

*Primary Examiner*—Melvin Marcelo
(74) *Attorney, Agent, or Firm*—Blakely, Sokoloff, Taylor & Zafman LLP

(57) ABSTRACT

A communications network is made up of a number of nodes. Frames of data transported on a circuit line are received at a first node of the network and segmented into packets such that a first packet includes a first portion of data from a frame and a second packet includes a second portion of data from the frame. A frame count value is added to a header in each of the first packet and the second packet. In addition, a first offset value is added to the first header and a second offset value is added to the second header. The first and second offset values correspond to respective temporal locations of the first and second portions of data from the frame of data. The first and second packet are transmitted across the telecommunications network to a second node where they are received and played out according to the frame count value and the first and second offset values such that the first and second portions of data occupy similar respective temporal locations within a played out frame as the first and second portions occupied in the original frame.

19 Claims, 10 Drawing Sheets

OTHER PUBLICATIONS

Sadie Lewis and V.C. Marney–Petix, "Your Pocket Sonet/ATM Glossary" Numidia Press, p. 49, 1993.

Newton's Telecom Dictionary, 9th Edition, p. 829, 1995.

Stratacom IPX Manual, pp. 2–15 to 2–25 and pp. 5–1 to 5–55 (Stratacom, Inc. Oct. 5, 1992; Mar. 15, 1993; Jul. 2, 1993).

The IPX Family Product System Description, pp. i–vi and 1–114 (Straacom, Inc. 1990).

Katsuyuki Yamazaki et al., "ATM Transport with Dynamic Capacity Control for Interconnection of Private Networks", IEICE Transactions Comm., vol. E77–B, No. 3, pp. 327–334 (Mar. 1994).

I. Widjaja et al., A High–Capacity Broadband Packet Switch Architecture Based on Multilink Approach; : MIL–COM '92 Communications–Fushing Command, Control and Intelligence, Conf. Record, No. 0–7803–0585–X/92, pp. 154–158 (IEEE Oct. 11, 1992).

* cited by examiner

| | | |
|---|---|---|
| 0 | 8 | |
| 1 | 9 | packet assembled/sent |
| 2 | 10 | network delay |
| 3 | 11 | network delay |
| 4 | 12 | network delay |
| 5 | 13 | null_time |
| 6 | 14 | null_time |
| 7 | 15 | null_time, play pkt |
| 8 | 0 | |
| 9 | 1 | |
| 10 | 2 | |
| 11 | 3 | |
| 12 | 4 | |
| 13 | 5 | |
| 14 | 6 | |
| 15 | 7 | |
| 0 | 8 | |
| 1 | 9 | |
| 2 | 10 | |

(2s complement arithmetic)

```
       sign bit
          ↓
  12   01100   FC_Local at time packet arrives
   3   00011   NullTimingdelay
  -1   11111   FC_Packet
  14   00011   FC_DeltaLCN
```

Fig. 11

TRANSPARENT CIRCUIT EMULATION FOR PACKET SWITCHING NETWORK

The present application is a continuation of application Ser. No. 08/721,193, filed Sep. 27, 1996, which has issued as U.S. Pat. No. 5,987,030, and is assigned to the same assignee as the present application.

BACKGROUND OF THE INVENTION

1. Field of the Invention

The present invention relates generally to inverse multiplexing and, more particularly, to a method and apparatus for providing transparent circuit connection between time division multiplexed circuit lines connected by a packet switching network.

2. Background Information

Modern telecommunication networks utilize packet switching techniques to route data between switches or nodes of the network in a connection oriented manner. Often, these packet switching networks provide multiple communication paths between nodes. Users having various voice, data and video communication equipment attached to end nodes of such a network often have no control over which communication path will be used between nodes. Nevertheless, users do require assurance that the communication network will route data through the network in a fashion which guarantees that the data will be played out of an end node in the same sequence that it was presented to a source node. Failure to do so may render communication between users impossible.

SUMMARY OF THE INVENTION

In one embodiment, a communication network is made up of a number of telecommunication nodes. Frames of data transported on a circuit line (TDM frames) are received at a first node of the network and segmented into packets such that a first packet includes a first portion of data from the TDM frame, a second packet includes a second portion of data from the TDM frame, etc. A frame count value is added to each packet header. In addition, a frame start offset value is added to each packet header. The packets are transmitted across the telecommunication network to a second node where they are received and played out according to the frame count and offset values such that the TDM frame is transmitted with its bytes in the same order as that in which the bytes were received and in the same position within the transmitted TDM frame that they occupied in the received TDM frame.

BRIEF DESCRIPTION OF THE DRAWINGS

The present invention is illustrated by way of example and not limitation in the figures of the accompanying drawings in which like references indicate similar elements and in which:

FIG. 11 illustrates a process for calculating FC_DeltaLCN according to one embodiment.

DETAILED DESCRIPTION

Figure 1:
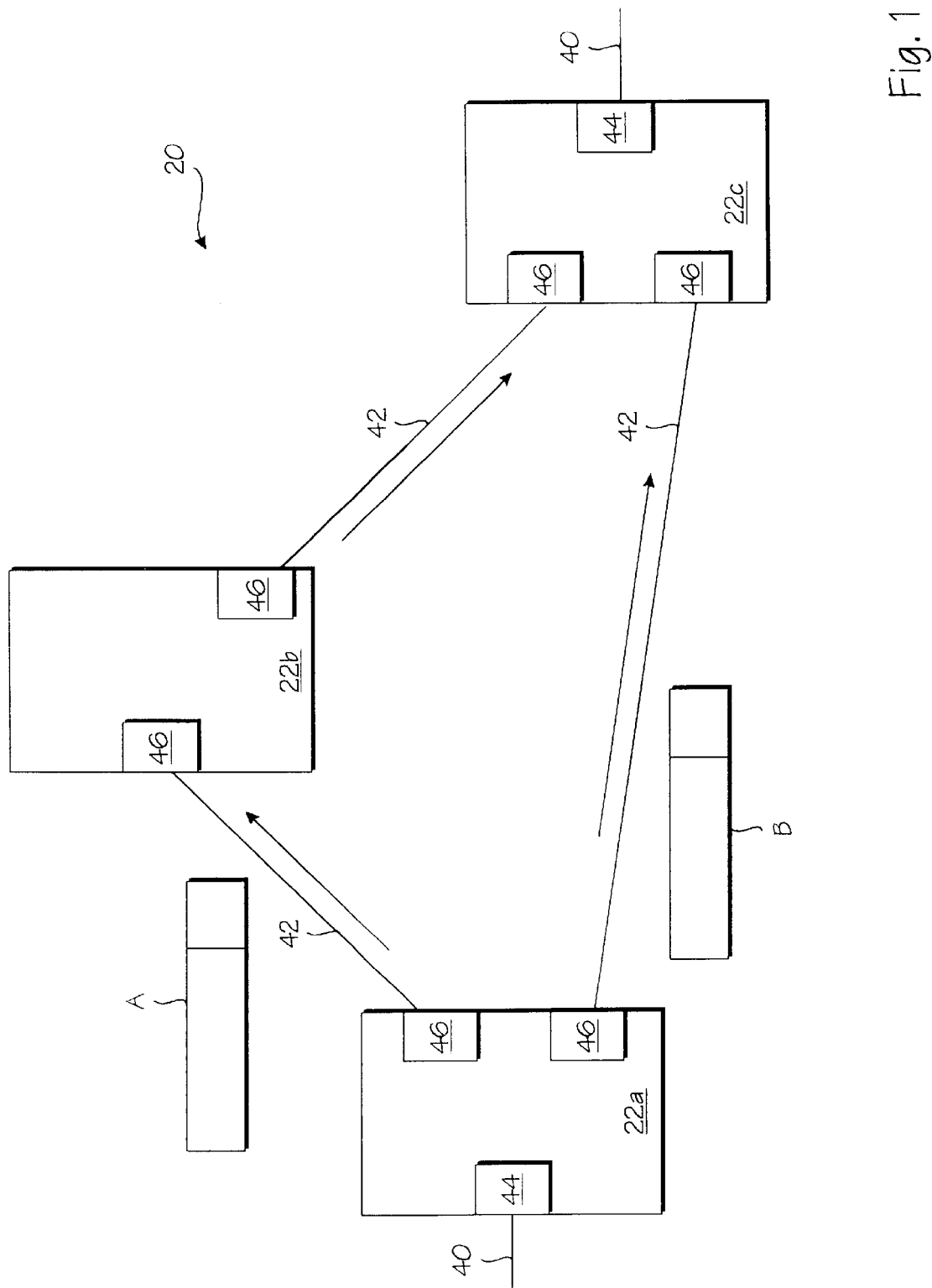
FIG. 1 illustrates an exemplary telecommunication network employing the apparatus and methods of the present invention.

Referring first to FIG. 1, an exemplary three node telecommunication network 20 is illustrated. Circuit lines 40 connect sources of digital data to network nodes 22A and 22C. The sources of digital data may include digital PABXs and D4 channel banks for voice transmission and data terminal equipment (DTEs), bridges, routers, video compression devices, or other sources of digital data. Each node 22A–22C may incorporate circuitry which will provide the transparent circuit emulation capabilities and methods of the present invention. The invention allows transparent routing of time division multiplexed data received over a circuit line 40 at a source node and transmitted over packet switched telecommunication network 20 to a destination node. At the destination node, multiple processors, that do not share any common memory or direct communication paths, disassemble and synchronize data packets that were routed asynchronously over various paths of the communication network 20 allowing the data to play out in the proper sequence at the destination node.

Nodes 22A, 22B, and 22C of telecommunication network 20 are interconnected by digital transmission lines 42. Those skilled in the art will appreciate that these digital transmission lines 42 may each comprise a long haul, high speed, digital network of various common carriers and may interconnect nodes 22A, 22B, and 22C at locations around the country or around the world. These digital transmission lines 42 may comprise terrestrial lines of copper, fiber optics, or digital microwave radio. Often, for international circuits, digital transmission lines 42 comprise satellite links.

Data is transported through telecommunication network 20 on digital transmission lines 42 in the form of packets or cells. Consequently, these lines are often referred to as packet lines 42. For the case where packet lines 42 are T1 lines, data is transmitted at 1.544 million bits per second (Mbps).

Figure 2:
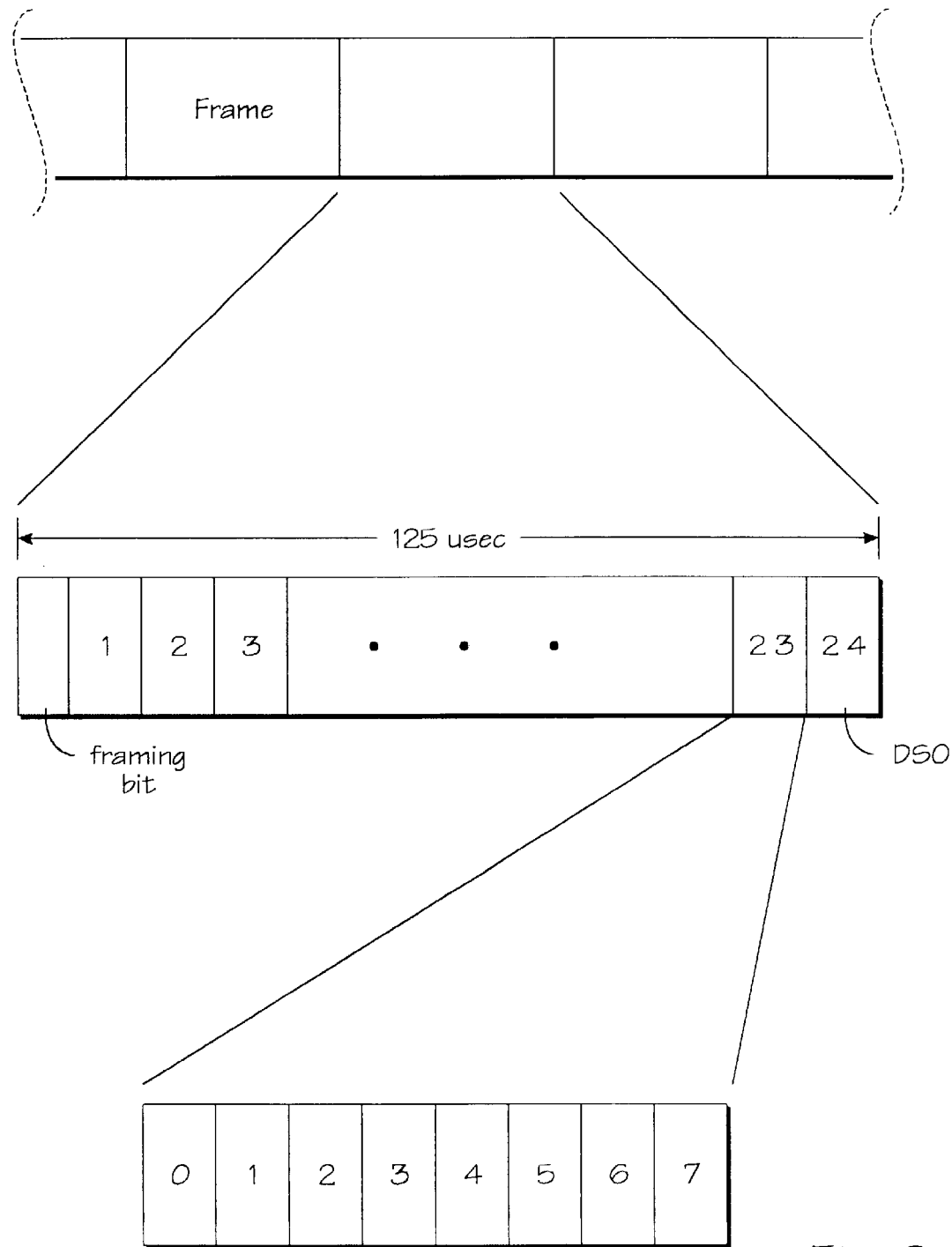
FIG. 2 illustrates a typical TDM frame as may be transmitted over a circuit line in the telecommunication network illustrated in FIG. 1.

In contrast, on T1 circuit lines, such as circuit lines 40, data within each frame is organized as shown in FIG. 2. Each frame includes 24 bytes of data, each byte consisting of eight bits. Frames of data are transmitted eight thousand times a second. Individual channels of data are time division multiplexed within each frame, hence, the frames are referred to a time division multiplexed (TDM) frames.

Returning to FIG. 1, each node 22A–22C, may include channelized data pads (CDPs) 44 and network trunk cards (NTCs) 46. CDPs 44 provide an interface between the nodes 22A–22C and circuit lines 40. Similarly, NTCs 46 provide an interface between nodes 22A–22C and packet lines 42.

Figure 3:
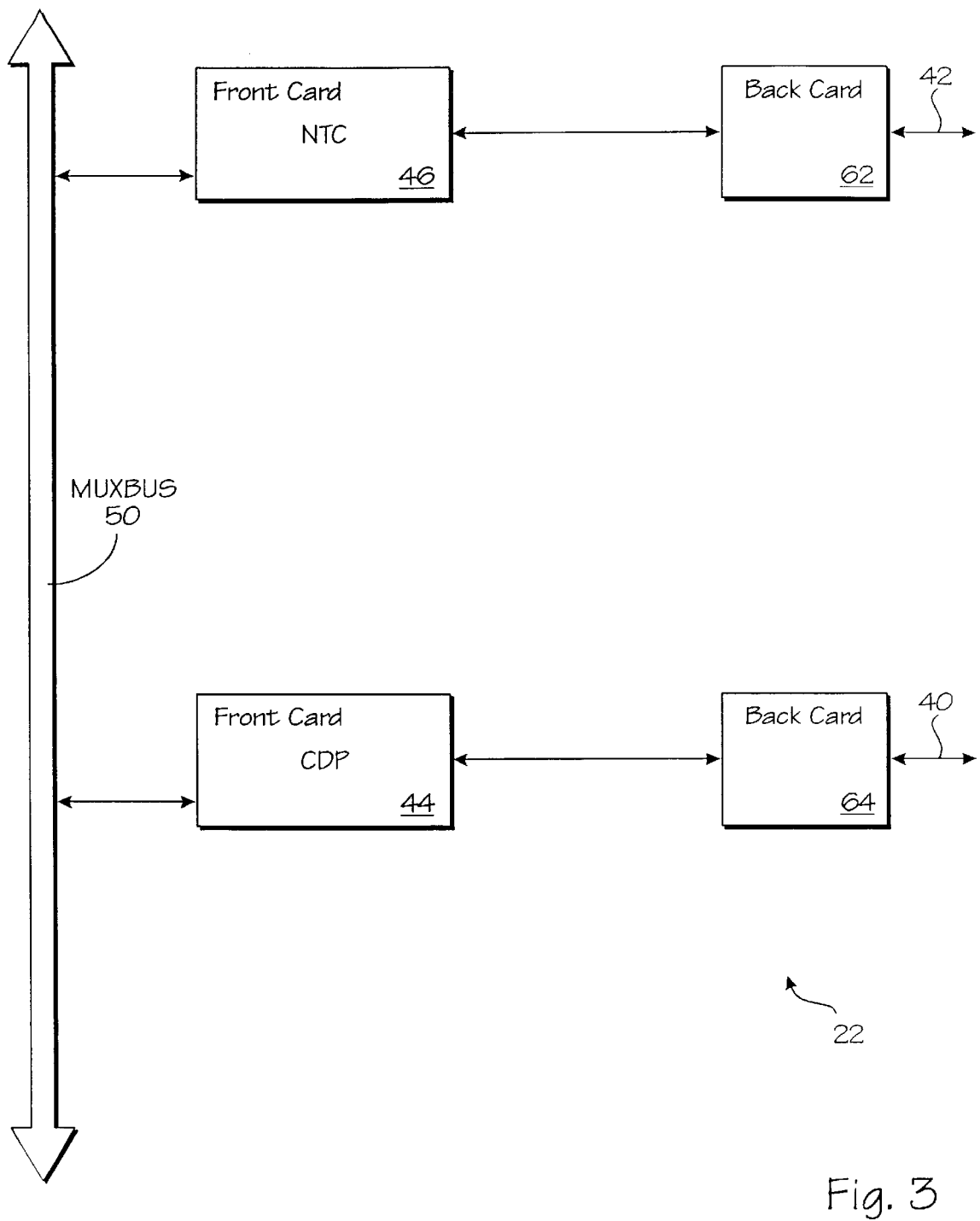
FIG. 3 illustrates a TDM frame signal path through a node of a telecommunication network in accordance with the present invention.

FIG. 3 illustrates the general TDM frame signal flow through a node 22 (it will be appreciated that nodes 22A–22C are substantially similar and are referred to in FIG. 3 as a node 22). TDM frames are input through a circuit line 40 to an interface card 64 which converts the input data to a standardized DSI format. The data is then packetized by a CDP card 44. The packetized data is then applied to a MUX BUS 50 where it is made available to any other card in the node 22. It will be appreciated that a node 22 may have a number of cards, including CDP cards 44 and NTC cards 46. Where packets of data are destined for remote nodes, they are gathered from the MUX BUS 50 and queued up for transmission by NTC card 46. Packets which have been queued for transmission at NTC card 46 are sent off to the remote node through a packet line interface card 62 across a packet line 42. The sequence of events is then reversed at the remote node (receiving node). For the situation where data received at CDP card 44 is destined for another circuit situation where data received at CDP card 44 is destined for another circuit termination on the local node 22, the data is transmitted across the MUX BUS 50 to another CDP card 44 where it is de-packetized and sent off to the local user device across a circuit line 40.

Figure 4:
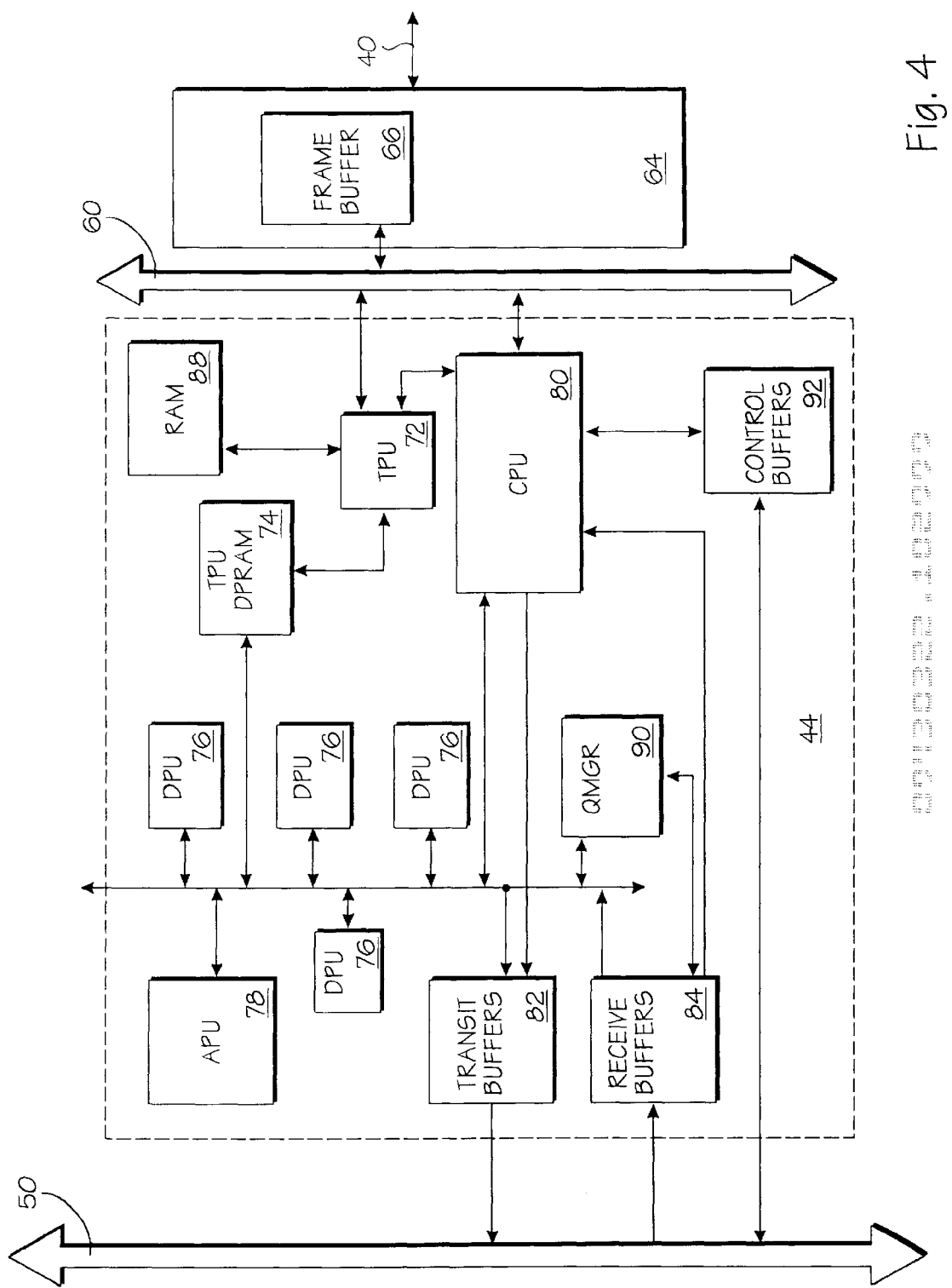
FIG. 4 illustrates the major components of a channelized data pad (CDP) configured for use with the present invention.

Referring now to FIG. 4, the interface card 64 receives input data from circuit line 40 and stores it in a frame buffer 66 to reduce the effects of jitter. The data bits are passed to CDP 44 under the control of TDM Processing Unit (TPU) 72 at 125 microsecond intervals via local bus 60. It will therefore he appreciated that frame buffer 66 stores one frame's worth of data before forwarding it on to CDP 44.

TPU 72 deposits processed data in TPU DPRAM 74. The processed data is then accessed by one of four Data/Signal Processing Units (DPUs) 76 for assembly into packets with a destination header address. After being packetized, the data is queued and transmitted out over MUX BUS 50 via transmit buffers 82. Once on MUX BUS 50, packets are forward to an NTC card 46 to be routed through the network 20.

At a receiving node, the process just described occurs in reverse order, that is, packets are received from a packet line 42 at an NTC card 46 and provided across the MUX BUS 50 to a receive buffer 84 on CDP 44. Header information is stripped off and packets are queued up into frames utilizing DPUs 76 and Queue Manager (QMGR) 90. When a frame of data has been assembled, it is passed to the frame buffer 66 of interface card 64 via local bus 60. The frame is then transmitted to user equipment across circuit line 40. All CDP 44 functions are under the control of central processing unit (CPU) 80. CPU 80 may provide software to TPU 72, DPUs 76 and QMGR 90 upon power up or reset. This software may allow these other units to operate in the manner just described.

CDP 44 allows for transparent circuit transmission and reception of bundled N×DS0 kbps data. Bundled data consists of one or more DS0 time slots considered as a single channel of N×DS0 rate. The time slots do not have to be contiguous. The time slots are processed and transported through communication network 20 as a single channel, maintaining the relative time slot synchronization between each DS0 sample from end to end. Because the CDP's maximum bundled data size is 8×64, 3 connections will need to he added to create a T1 channel (3×8=DS0s).

The need for connection-to-connection synchronization can be illustrated with reference to FIG. 1. Suppose a packet A is assembled from data in channels 3 and 4 of frames received at node 22A while a packet B is assembled from data in channel 12 of such frames. Both packets A and B are destined for node 22C, however, packet A travels from node 22A through node 22B to node 22C while packet B travels directly from node 22A to node 22C. If the total network delay experienced by packet A is 15 msec while the total network delay experienced by packet B is only 10 msec, it will he appreciated that packet B will arrive at node 22C before packet A. However, if the data in packet B is played out of node 22C before the data in packet A is played out, the relative synchronization of the channels in the originally received frames will be lost. This may render the played out message unintelligible at the far end (e.g., a user connected to node 22C). Accordingly, some means is required to ensure TDM data will be played out in exactly the same order that it was received, even if the packets of the connections used to create the TDM circuit experience different network delays.

To accomplish frame and DS0 synchronization, each connection (LCN) manages the above described varying network delays using far-end and local frame counters and another variable called FC_DeltaMaster (see below). According to the methods of the invention, because each connection will have identical far-end frame count values at the far-end (i.e., the transmitting node or node 22A in the above example) and identical local frame count values at the local end (node 22C in the above example), if packets are played out only when the local frame count equals the far end frame count (as added to a packet's header prior to transmission) plus FC_DeltaMaster, network delay will be the same for all connections. For the above example, this would mean that packet A will be played out at the same time as packet B even though packet B arrived at node 22C before packet A.

Figure 5:
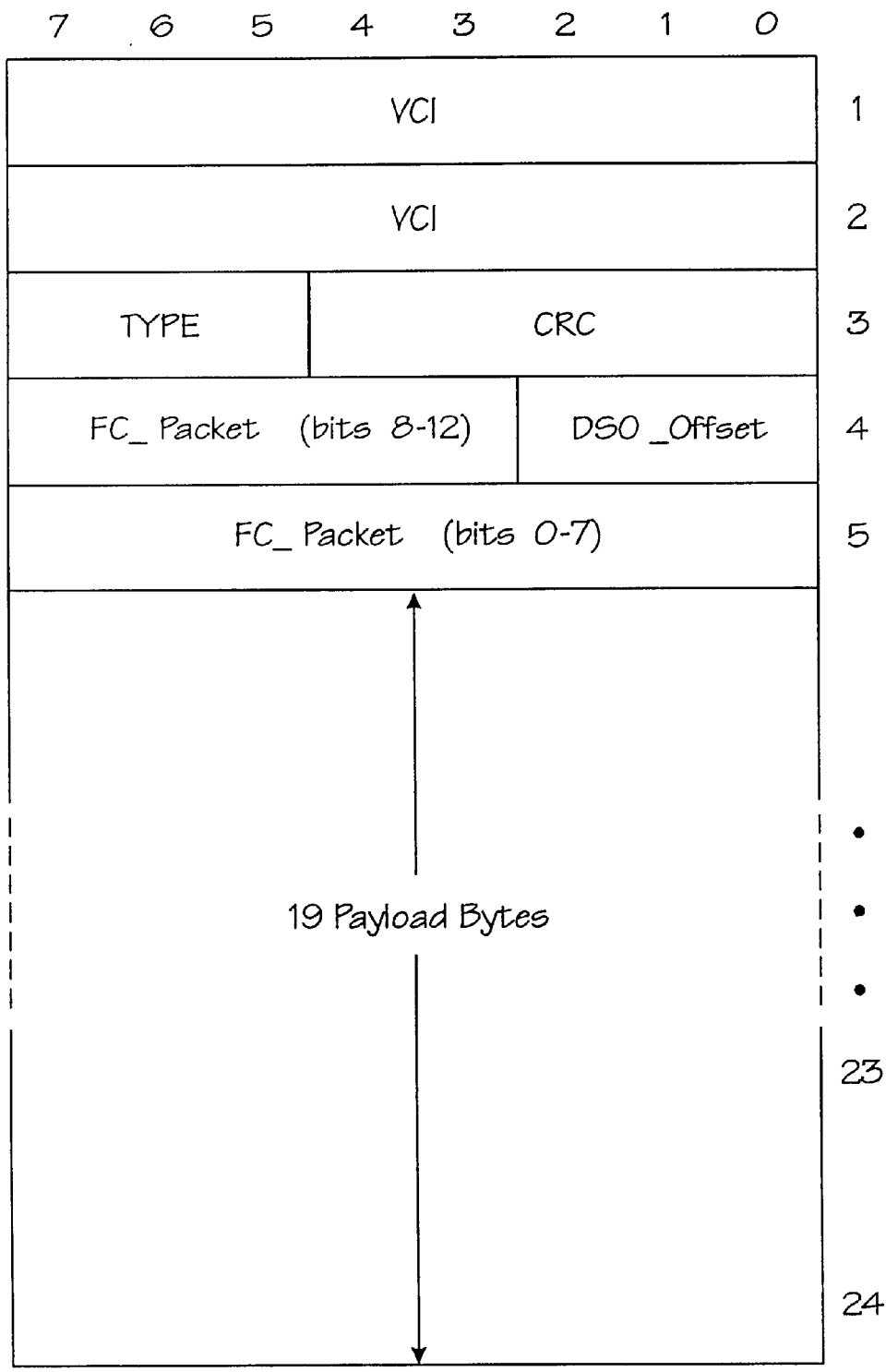
FIG. 5 illustrates the format of a packet according to the present invention.

Assume, for example, that a 19-byte payload packet, such as that shown in FIG. 5, is used, 13-bits of header information may be allocated for a frame count field (FC_Packet) and 3-bits of header information may be allocated for a byte count field (DS0_Offset). The frame count field, FC_Packet, is used to force frame alignment while the byte count, DS0_Offset, field is used to indicate which DS0 within a frame the data in the packet was taken from. The DS0_Offset field occupies bytes 0–2 of word 4 of the packet while the FC_Packet field occupies bytes 3–7 of word 4 and all of word 5 of the packet.

The manner in which the frame count and byte count values are used to maintain synchronization within telecommunication network 20 will now be described in detail. In the following description, the following variables are used:

FC_Local: FC_Local is a 13-bit frame count value that all four DPUs 76 use in conjunction with FC_DeltaMaster (see below) or NullTimingDelay to determine when a packet will be played out. The NullTimingDelay is the summation of the queuing delays that a packet may experience while passing through its route. This is a value determined by network management software at the time when a connection is initially established. It is provided to an end node as required. FC_Local is maintained by TPU 72 and is made available to the DPUs 76 via the TPU DPRAM 74. Because FC_Local counts frames, it increments by one every 125 microseconds.

FC_Packet: FC_Packet is the 13-bit frame count value that is placed in the header of every packet to be transmitted on a packet line 42.

FC_DeltaLCN: FC_DeltaLCN is used in the de-packetizing process for each logical connection (LCN). FC_DeltaLCN is derived from FC_Local, NullTimingDelay and FC_Packet as follows:

FC_DeltaLCN=(FC_Local+NullTimingDelay)−FC_Packet The DPUs 76 calculate this value when a connection is first added and the first packet of the connection arrives at the receiving node, this value is then made available to CPU 80.

FC_DeltaMaster: FC_DeltaMaster is a delta frame count value that all LCNs use to initialize their associated packet buffers. It is also used in conjunction with FC_Packet and FC_Local to decide when it is time to play out a packet:
If,
FC_Local=FC_Packet+FC_DeltaMaster, the packet is played out.

During packet transmission, for each frame of data received at interface card 64, data from each DS0 within the frame is stored in a separate DS0 buffer within frame buffer 66. When an entire frame of data has been stored, the content of each DS0 buffer is transferred, under the control of TPU 72, to an associated DS0 register within TPU DPRAM 74. From there, the DS0s are bundled into packets under the control of one of the DPUs 76 according to whichever logical connection is being serviced.

Figure 6:
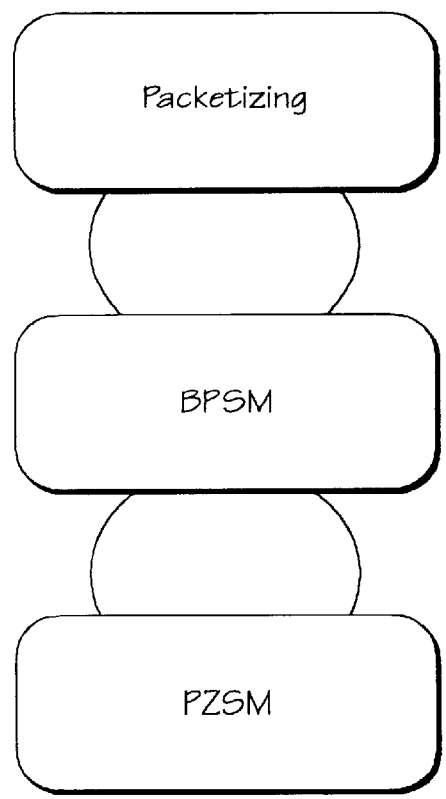
FIG. 6 is a state diagram illustrating a packetizing operation in accordance with the present invention.

FIG. 6 illustrates the packet construction operation performed by each DPU 76. The operation is assigned two 24-word (8-bits per word) packet buffers with which to construct packets. As shown, a main packetizing state machine calls a bit packing state machine (BPSM) which reads a DS0 register for each DS0 in its bundle. The BPSM, in turn, calls a given state of a 21-state packetizing buffer state machine (PZSM) whenever a byte is written to the packet buffer containing the packet being assembled. The various states of the PZSM perform the various functions required during packet assembly, including: swapping packet buffers; transmitting a completed packet; updating a packet's frame count (FC_Packet); updating a packet's DS0 Offset; calculating the next packet's DS0 Offset; and updating transmitted packet statistics.

In operation, when a packet is to be assembled, the main packetizing state machine calls the BPSM. The BPSM, in turn, calls the first state of the PZSM which loads the first byte of DS0 data into the first payload byte position in the packet being assembled and also loads the FC_Packet and DS0 Offset fields in the packet's header. Each packet constructed from the same frame's worth of data will have the same value of FC_Packet because this value is updated only once per frame. The DS0_Offset will be computed based on the DS0 registers being accessed. The PZSM then returns to the BPSM. The BPSM then loads the second payload byte and calls the PZSM. This continues, with the BPSM calling the various state of the PZSM, until all of the packet payload bytes have been loaded. The last PZSM state calculates the next packet's DS0 Offset and performs a packet buffer swap operation so that the next packet is assembled in the other available packet buffer. The completed packet may then be transmitted out of the CDP 44.

The common 13-hit counter that the DPUs 76 use to maintain FC_Packet is maintained on TPU 72. The counter increments each frame (125 msec). Because each connection on all the DPUs 76 needs to be able to access this common 13-bit counter, it is passed to each DPU 76 via the TPU DPRAM 74.

Figure 7:
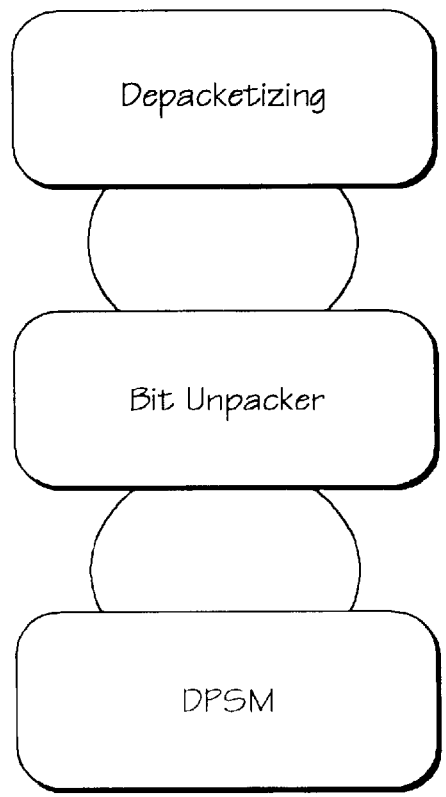
FIG. 7 is a state diagram illustrating a depacketizing operation in accordance with the present invention.

During receive operations, a depacketizing state machine operating within each DPU 76 disassembles the data from received packets into DS0 registers so that the data can be played out in the proper sequence. This process is illustrated in FIG. 7. The depacketizing state machine calls a bit unpacking state machine which writes data from a received packet to a DS0 register for each DS0 in its bundle. A given bit unpacking state will, in turn, call a buffer management state. For one embodiment, the depacketizing buffers are 16-bits wide. The hit unpacking process essentially takes the payload bits from a DS0 depacket buffer word and forms a bit stream in which the least significant bit is transmitted first. The eight least significant bits are then cut out of this bit stream and written to a DS0 register. When an entire frame's worth of data has been collected in the DS0 registers, the frame is transmitted from CDP 44 to interface card 64 for transmission out of node 22.

Figure 8:
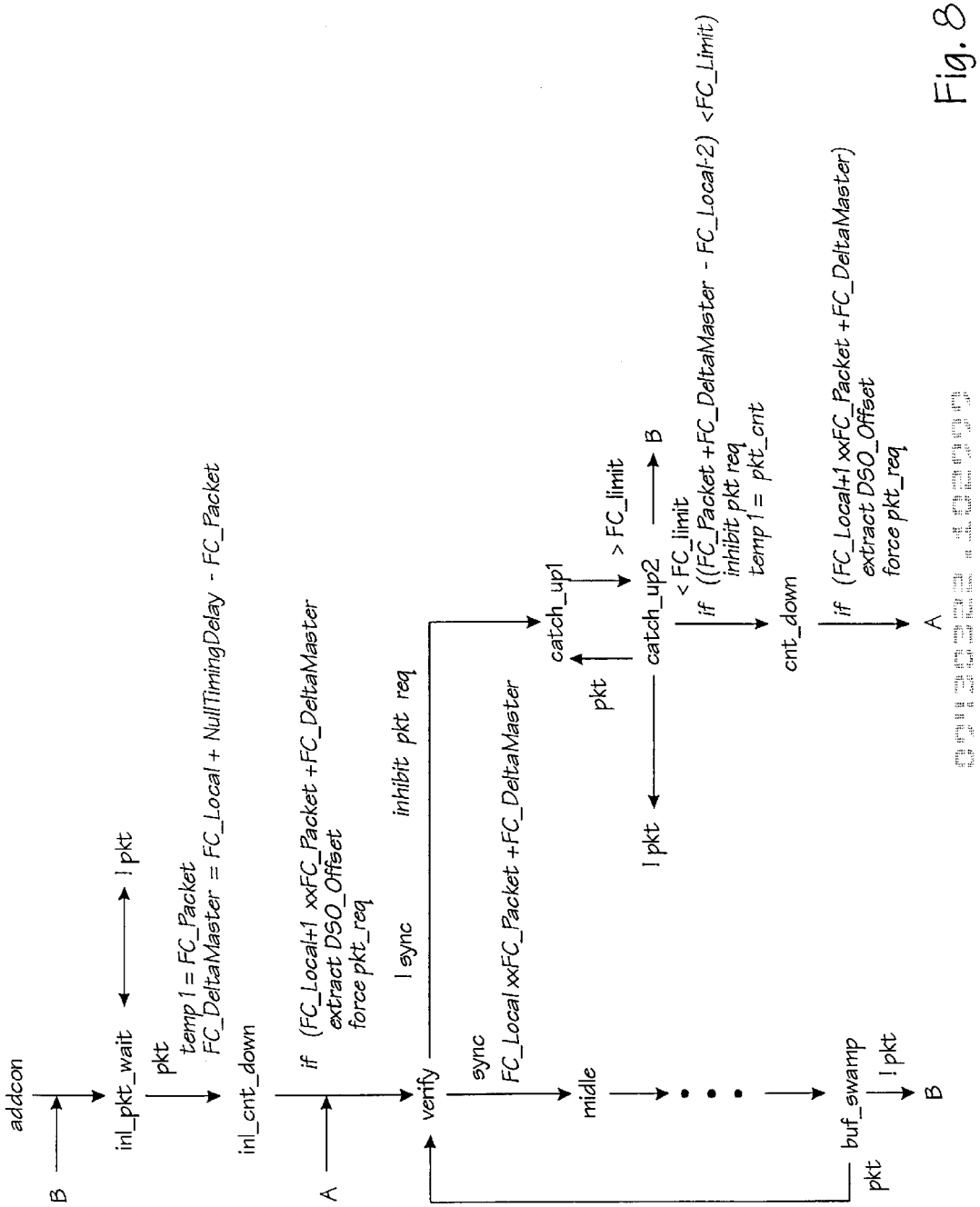
FIG. 8 is a state diagram further illustrating the depacketizing buffer state of the operation depicted in FIG. 7.

The depacketizing buffer state machine (DPSM) is described with reference to FIG. 8. The DPSM contains 14 states. A given state is called from the bit unpacker state machine. Some of the states of the DPSM are redundant in that they simply return to the bit unpacker state machine. The remaining states of the DPSM perform the various functions which are needed at points during the packet disassembly process. These include: swapping packet buffers; calculating the next packet buffer address; waiting for a frame to finish (synchronizing); and waiting for a packet to arrive (underrun condition).

When a connection is first added, the "inl_pkt_wait" state is called. This state waits for a packet associated with the connection to arrive. Once this happens, the packet delay count (i.e., NullTimingDelay) is set and the "inl_cnt_down" state is called. It is during the inl_pkt_wai state that FC_DeltaMaster is calculated.

The inl_cnt_down state waits until FC_Local=FC_Packet+FC_DeltaMaster (the packet play out condition). When this condition is true, the state machine goes to the next state.

When the condition FC_Local=FC_Packet+FC_DeltaMaster is true, the "verify" state is entered. The verify state, as the name implies, verifies synchronization by checking that FC_Local=FC_Packet+FC_DeltaMaster. When this condition is true, the "midle" states are called. The midle states presume no buffer management functions are required and simply return. It is during these states that the packets are played out in proper sequence.

When the last payload word of a depacketizing buffer has been processed by the bit unpacker state machine, the DPSM enters the "buf_swap" state. This state swaps the depacketizing buffers to provide a packet buffer with data available for processing.

If the verify condition (FC_Local=FC_Packet+FC_DeltaMaster) is not true, the "catch_up1" state is entered. This state is used along with "catch_up2" to recover when FC_Local is in front of FC_Packet+FC_DeltaMaster. By alternating between catch_up1 and catch_up2, a packet is requested and tested every other frame. Eventually, (FC_Packet+FC_DeltaMaster−FC_Local−2)<FC_Limit will be true and the depacketizing process can continue at the "cnt_down" state which resembles the inl_cnt_down state.

Figure 9:
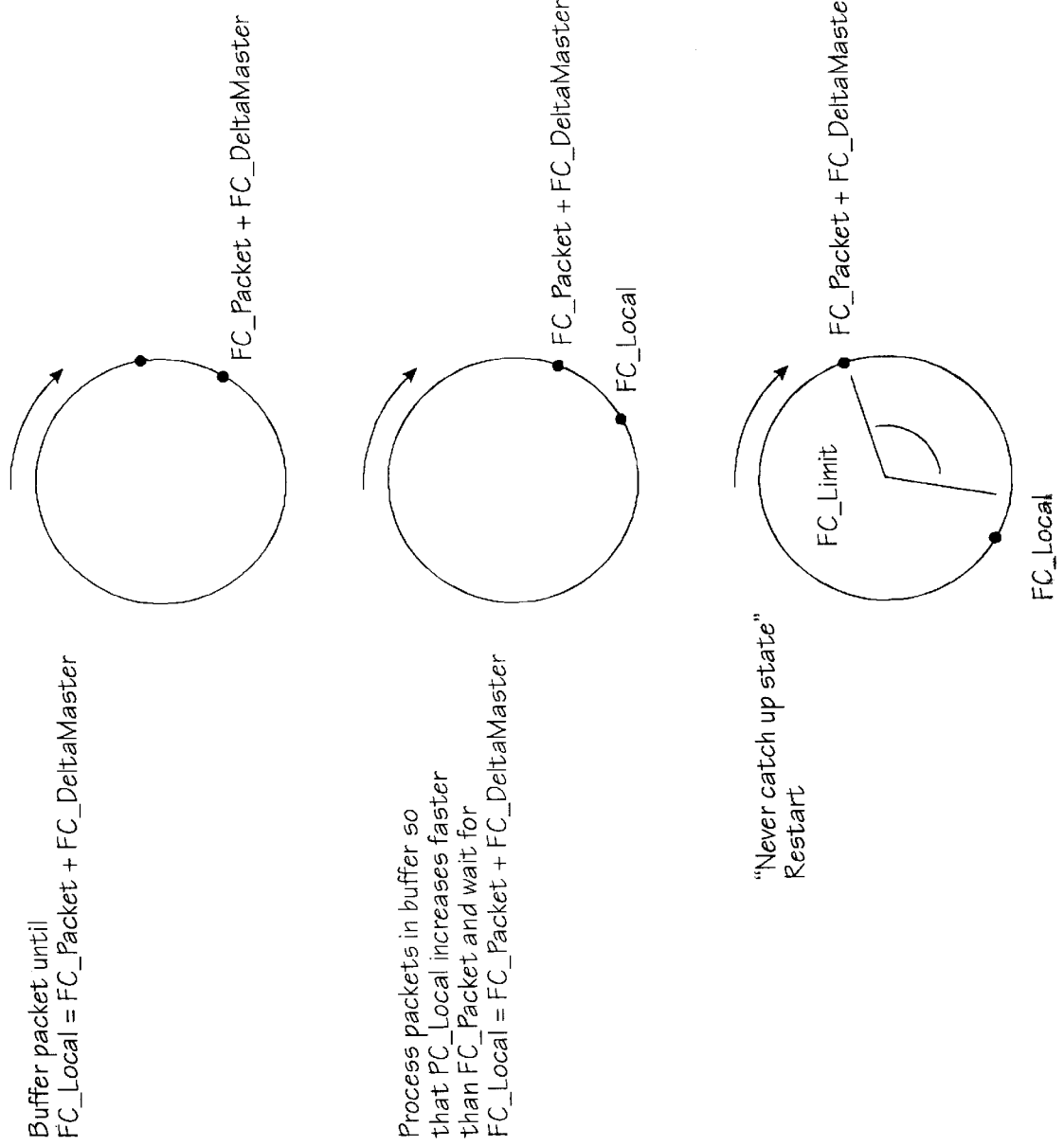
FIG. 9 illustrates the catch_up process used in the state diagram of FIG. 8.

This process is further illustrated in FIG. 9. As shown in the top illustration in FIG. 9, FC_Local represents a counter value at the receiving node while FC_Packet is retrieved from the header of each packet upon receipt of the packet. By waiting until FC_Local=FC_Packet+FC_DeltaMaster before the packet is played out synchronization is assured. However, sometimes the value of FC_Local will be in front of the value of FC_Packet+FC_DeltaMaster, as shown in the middle illustration. In such a case, packets are processed (i.e., dropped) at the receiving node at a rate faster than the rate at which FC_Local increases (once every 125 msec). This allows FC_Local to eventually equal FC_Packet+FC_DeltaMaster and new packets can then be played out. Those skilled in the art will recognize that there will be some cases (as shown on the bottom illustration of FIG. 9) where FC_Local will never catch up to FC_Packet+FC_DeltaMaster because there will be no more packets in the queue for processing. This "point of no catch up" is referred to as FC_Limit and will depend upon the packet queue size. If the catch up process recognizes that the difference between FC_Packet and FC_Local is such that FC_Limit has been exceeded, the process restarts at point B in FIG. 8.

Figure 10:
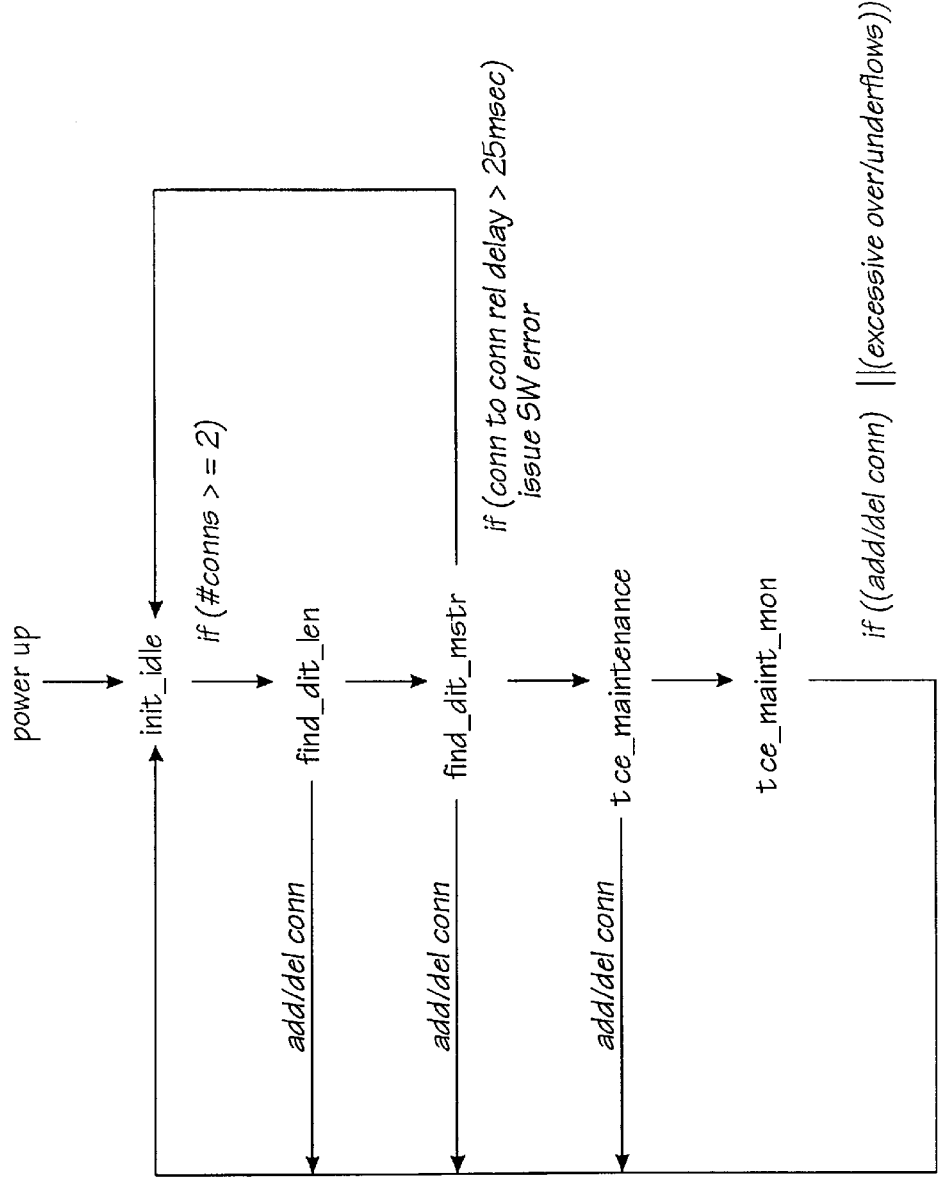
FIG. 10 is a state diagram illustrating one process for selecting a master delta value according to the present invention.

The CPU 80 determines the value of FC_DeltaMaster according to the state diagram shown in FIG. 10. Each LCN is then provided with this value for use in determining when to play out packets.

Referring to FIG. 11, upon power up and as each connection is added or deleted, the CPU 80 enters the "init_idle" state which checks to determine whether two or more active LCNs exist. If so, its data bases are updated to allow transparent circuit emulation (TCE) processing to begin.

TCE processing begins at the "find_dlt_len" state where several sample FC_DeltaLCN values are taken for each active connection and the minimum and maximum values for each connection are tabulated.

Next, the "find_dlt_mstr" state is called. This state determines the LCN that has the longest total network delay by evaluating the FC_DeltaLCN values obtained in the find_dlt_len state. The FC_DeltaLCN value that represents the longest total network delay becomes FC_DeltaMaster. The manner in which FC_DeltaLCN values are calculated is described with reference to FIG. 11.

When a packet first arrives at a node 22, FC_DeltaLCN is calculated using the current FC_Local, FC_Packet and the packet's NullTimingDelay. In particular, $$FC\_DeltaLCN = (FC\_Local|_{at\ time\ of\ pkt\ arrival} + NullTimingDelay) - FC\_Packet$$

The example in FIG. 11 uses 4-bit FC values for clarity. Assume that when the packet is transmitted from a source node (say, 22A), FC_Packet (as added into the packet's header at the source node) is 1 and FC_Local (maintained at the destination node) is 9. The packet is transmitted through network 20 and arrives at the destination node (say, 22C) when FC_Local is 12. If the NullTimingDelay is 3 then FC_DeltaLCN=(12+3)−1=14.

The NullTimingDelay is calculated as follows. It will be appreciated that there will be a delay in playing out the first packet (necessarily so because the first packet is not played out until FC_Local=FC_Packet+FC_DeltaMaster). This delay causes an elastic data buffer to be created. The elastic buffers are implemented in queues maintained by QMGR 90. Upon initialization, a NullTimingDelay's worth of packets (or greater) will be stored in the queue. Network delays then will not cause data underflows because packets can be drawn from the buffer when delays are experienced. When a connection is programmed with FC_DeltaMaster, the size of a connection's elastic buffer is determined by the sum of FC_DeltaMaster and the connection's network delay. Connections that have smaller NullTimingDelays, and thus smaller network delays, will use more buffer space.

Returning to FIG. 10, for one embodiment if the difference in relative delay between any channel is greater than 25 msec, an error condition is issued and the CPU 80 returns to the init_idle state. Otherwise, the "tce_maintenance" state is entered after FC_DeltaMaster has been calculated.

The tce_maintenance state programs all active connections with FC_DeltaMaster. After a set period, it calls the state "tce_maint_mon" which monitors for buffer overruns and underruns. If an excessive number of overruns or underruns are experienced, CPU 80 returns to the init_idle state.

From the above discussion it should be appreciated that by waiting until FC_Local=FC_Packet+FC_DeltaMaster before playing out a packet, proper frame and DS0 synchronization is maintained.

If a packet is lost during transmission, the next packet received at the end node will not meet the above verification requirement and will not he played out. Instead, conditioning data will be placed into the DS0 register. To regain synchronization, the end node simply waits until FC_Local=FC_Packet+FC_DeltaMaster, then begins playing out packets once again.

Accordingly, a method and apparatus to ensure proper frame synchronization across a packet switching network has been described. Although described with reference to particular embodiments, those skilled in the art will appreciate that the present invention may be practiced without some or all of these details and that various modifications within the spirit and scope of the present invention made he made thereto. Accordingly, the above description and accompanying drawings are to be regarded as illustrative only and the present invention should only be limited in terms of the claims which follow.

What is claimed is:

1. A method of providing transparent circuit emulation between nodes of a communications network, the method comprising:

segmenting at a first node of said network a frame of data into a first packet and a second packet such that said first packet comprises a first portion of said frame of data and said second packet comprises a second portion of said frame of data, said first packet having a first header and said second packet having, a second header;

adding a frame count value to each of said first header and said second header;

adding a first offset value to said first header and a second offset value to said second header, said first and second offset values corresponding to respective temporal locations of said first and second portions within said frame of data;

transmitting said first and second packets from said first node to a second node of said network; and playing out said first and second packets at said second node as a played out frame according to said frame count value and said first and second offset values such that said first and second portions occupy similar respective temporal locations within said played out frame as said first and second portions occupied in said frame of data.

2. The method of claim 1, wherein playing out comprises:

determining a master network delay value for said communication network;

generating a local frame count value at said second node and periodically incrementing said local frame count value; and playing out said first and second packets at said second node when said local frame count value equals the sum of said frame count value and said master network delay value.

3. The method of claim 2, wherein said master network delay value corresponds to a longest network delay value for one of a plurality of connections within said communication network supported by said second node.

4. A computer readable medium having stored thereon sequences of instructions which are executable by a digital processing system, and which, when executed by the digital processing system, cause the system to perform a method comprising synchronizinig data transmitted as packets via different paths through a data communication network according to local synchronization values determined at a receiving end of said network, a master network delay value and remote synchronization values determined at a transmitting end of said network wherein said synchronizing includes:

segmenting at said transmitting end of said network a frame of data into a first packet and a second packet such that said first packet comprises a first portion of said frame of data and said second packet comprises a second portion of said frame of data, said first packet having a first header and said second packet having a second header;

adding a frame count value to each of said first header and said second header;

adding a first offset value to said first header and a second offset value to said second header, said first and second offset values corresponding to respective temporal locations of said first and second portions within said frame of data;

transmitting said first and second packets from said transmitting end of said network to said receiving end of said network via separate paths through said network; and playing out said first and second packets at said receiving end of said network as a played out frame according to said frame count value and said first and second offset values such that said first and second portions occupy similar respective temporal locations within said played out frame as said first and second portions occupied in said frame of data.

5. The computer readable medium of claim 4, wherein playing out comprises:

generating a local frame count value at said receiving end of said network and periodically incrementing said local frame count value; and playing out said first and second packets at said receiving end of said network when said local frame count value equals the sum of said frame count value and said master network delay value.

6. The computer readable medium of claim 5, wherein said master network delay value corresponds to a longest network delay value for one of a plurality of connections within said network supported by said receiving end of said network.

7. A computer readable medium having stored thereon sequences of instructions which are executable by a digital processing system, and which, when executed by the digital processing system, cause the system to perform a method comprising synchronizing data transmitted as packets via different paths through a data communication network according to local synchronization values determined at a receiving end of said network, a master network delay value and remote synchronization values determined at a transmitting end of said network wherein each packet of data includes a frame count value and an offset value which together uniquely identify each packet of data and wherein said synchronizing includes:

recovering said data from each packet of data received at said receiving end of said network using said frame count values and said offset values.

8. The computer readable medium of claim 7, wherein recovering comprises:

synchronizing said frame count values with a local count value at said receiving end of said network for each packet; and playing out packets in an order at said receiving end of said network according to said synchronizing said frame count values.

9. The computer readable medium of claim 8, wherein said synchronizing said frame count values includes:

summing said master network delay value with each of said frame count values to determine a sum value; and comparing said sum value with said local count value, wherein respective packets are played out of said receiving end of said network when said sum value for each respective packet equals said local count value.

10. The computer readable medium of claim 7 wherein said master network delay value is determined when a connection comprising said packets is established.

11. An apparatus for synchronizing connections within a communications network, comprising:

a first logic for receiving packets of data for a plurality of connections, each connection supported by a different communication path through said network, said packets having associated header information including a frame count value and an offset value;

a second logic for summing said frame count and offset values for a received packet with a master network delay associated with one of said plurality of connections, said second logic coupled to said first logic; and a third logic for comparing a sum of said frame count and offset values for a received packet and said master network delay with a local count value different from said master network delay so as to determine a time to play out said received packet, said third logic coupled to said second logic.

12. The apparatus of claim 11 further comprising a counter coupled to said second logic, said counter for generating said local count value.

13. The apparatus of claim 11 wherein said first logic includes logic for buffering a plurality of received packets.

14. A method, comprising:

segmenting at a first node of a communication network a frame of data into a first packet and a second packet such that said first packet comprises a first portion of said frame of data and said second packet comprises a second portion of said frame of data, wherein said first packet or said second packet does not comprise data from another frame of data, said first packet having a first header and said second packet having a second header;

adding a frame count value to each of said first header and said second header;

adding a first offset value to said first header and a second offset value to said second header, said first and second offset values corresponding to respective temporal locations of said first and second portions within said frame of data;

transmitting said first and second packets from said first node to a second node of said network; and playing out said first and second packets at said second node as a played out frame according to said frame count value and said first and second offset values such that said first and second portions occupy similar respective temporal locations within said played out frame as said first and second portions occupied in said frame of data.

15. The method of claim 14, wherein playing out comprises:

determining a master network delay value for said communication network;

generating a local frame count value at said second node and periodically incrementing said local frame count value; and playing out said first and second packets at said second node when said local frame count value equals the sum of said frame count value and said master network delay value.

16. The method of claim 15, wherein said master network delay value corresponds to a longest network delay value for one of a plurality of connections within said communication network supported by said second node.

17. An apparatus for synchronizing connections within a communications network, comprising:

a buffer to receive packets of data for a plurality of connections, each connection supported by a different communication path through the network, the packets having associated header information including a frame count;

a processor to calculate a master network delay;

logic to sum the frame count for a received packet with the master network delay and to compare the sum of the frame count for the received packet and the master network delay with a local count value to determine a time to play out the received packet.

18. The apparatus of claim 17, wherein the logic comprises a state machine.

19. The apparatus of claim 17, further comprising a counter to generate the local count value.

* * * * *